US011858102B2

(12) United States Patent
Lachica Koch et al.

(10) Patent No.: US 11,858,102 B2
(45) Date of Patent: Jan. 2, 2024

(54) HAND-HELD POWER TOOL

(71) Applicant: Hilti Aktiengesellschaft, Schaan (LI)

(72) Inventors: Daniela Lachica Koch, Augsburg (DE); Markus Sommer, Westendorf (DE); Walter Martinez De Virgala Kalitta, Gilching (DE); Olaf Koch, Kaufering (DE)

(73) Assignee: Hilti Aktiengesellschaft, Schaan (LI)

( * ) Notice: Subject to any disclaimer, the term of this patent is extended or adjusted under 35 U.S.C. 154(b) by 59 days.

(21) Appl. No.: 17/049,691

(22) PCT Filed: Jun. 6, 2019

(86) PCT No.: PCT/EP2019/064822
§ 371 (c)(1),
(2) Date: Oct. 22, 2020

(87) PCT Pub. No.: WO2019/238529
PCT Pub. Date: Dec. 19, 2019

(65) Prior Publication Data
US 2021/0245348 A1 Aug. 12, 2021

(30) Foreign Application Priority Data
Jun. 11, 2018 (EP) .................................... 18177018

(51) Int. Cl.
*B25D 16/00* (2006.01)
*B25F 5/02* (2006.01)

(52) U.S. Cl.
CPC .............. *B25D 16/006* (2013.01); *B25F 5/02* (2013.01); *B25D 2250/255* (2013.01); *B25D 2250/261* (2013.01); *B25D 2250/265* (2013.01)

(58) Field of Classification Search
CPC ............ B25D 16/006; B25D 2250/255; B25D 2250/261; B25D 2250/265; B25F 5/02; H02K 11/28
See application file for complete search history.

(56) References Cited

U.S. PATENT DOCUMENTS 6,489,578 B1 * 12/2002 Jung ...................... H01H 9/063 200/332.2
6,550,545 B1 * 4/2003 Manschitz ........... B25D 16/006 173/217

(Continued)

FOREIGN PATENT DOCUMENTS

CN 103252759 A 8/2013
CN 107263404 A 10/2017

(Continued)

OTHER PUBLICATIONS

International Search Report of PCT/EP2019/064822, dated Aug. 5, 2019.

*Primary Examiner* — Robert F Long
*Assistant Examiner* — Eduardo R Ferrero
(74) *Attorney, Agent, or Firm* — Davidson, Davidson & Kappel, LLC

(57) ABSTRACT

A hand-held power tool having a motor-driven impact mechanism and monostable operating button. A locking switch for the monostable operating button has a sliding direction, an actuating knob, a catch and a sliding block, wherein the actuating knob is able to be moved by the user in the sliding direction from a releasing position to a locking position. The catch is pivotable in a pivoting direction perpendicular to the switching direction between a first position and a second position. The catch is disengaged from the operating button 6 in the first position and the catch engages in the operating button in the second position, arresting the operating button in the pressed position. The (Continued)

catch has, on a side facing in the pivoting direction, a slotted-guide face that is inclined with respect to the sliding direction. The sliding block bears on the slotted-guide face.

15 Claims, 3 Drawing Sheets

(56) References Cited

U.S. PATENT DOCUMENTS

| | | | | |
|---|---|---|---|---|
| 6,766,868 | B2 * | 7/2004 | Frauhammer | B25D 16/006 173/4 |
| 6,800,825 | B1 * | 10/2004 | Sasaki | H01H 21/24 200/402 |
| 2003/0037937 | A1 * | 2/2003 | Frauhammer | B25F 5/006 173/48 |
| 2006/0011361 | A1 * | 1/2006 | Shimma | H01H 9/06 173/48 |
| 2006/0060365 | A1 * | 3/2006 | Kunz | H01H 3/20 173/217 |
| 2006/0185865 | A1 * | 8/2006 | Jung | B25D 16/006 173/48 |
| 2006/0185866 | A1 * | 8/2006 | Jung | B25D 16/006 173/48 |
| 2006/0254785 | A1 * | 11/2006 | Watanabe | B25D 16/006 173/48 |
| 2008/0011592 | A1 | 1/2008 | Liebert et al. | |
| 2008/0017396 | A1 | 1/2008 | Kristen et al. | |
| 2009/0008111 | A1 | 1/2009 | Liebert et al. | |
| 2009/0056965 | A1 | 3/2009 | Moessnang et al. | |
| 2010/0175972 | A1 * | 7/2010 | Kimata | H01H 9/282 200/318.1 |
| 2010/0236800 | A1 * | 9/2010 | Watanabe | B25D 17/043 173/162.2 |
| 2011/0308920 | A1 * | 12/2011 | Shi | B25F 5/02 200/43.17 |
| 2012/0132689 | A1 * | 5/2012 | Dittrich | B25C 1/08 227/10 |
| 2013/0206434 | A1 * | 8/2013 | Braun | B25D 17/043 173/2 |
| 2014/0027253 | A1 * | 1/2014 | Braun | B25D 17/043 200/61.58 R |
| 2014/0054056 | A1 | 2/2014 | Moessnang et al. | |
| 2014/0174772 | A1 | 6/2014 | Mandalka et al. | |
| 2017/0129091 | A1 * | 5/2017 | Schiegel | B25D 16/006 |
| 2018/0021931 | A1 * | 1/2018 | Abe | B25D 16/006 173/48 |
| 2018/0085906 | A1 * | 3/2018 | Nitsch | B25D 16/006 |
| 2018/0099395 | A1 * | 4/2018 | Iida | H01H 9/06 |
| 2018/0207783 | A1 | 7/2018 | Liebert et al. | |
| 2018/0250802 | A1 * | 9/2018 | Iida | B25D 16/006 |
| 2018/0304453 | A1 * | 10/2018 | Schaer | B25F 5/00 |
| 2018/0361553 | A1 * | 12/2018 | Brinkmann | B25D 16/006 |
| 2019/0061081 | A1 * | 2/2019 | Schaer | B25D 16/00 |

FOREIGN PATENT DOCUMENTS

| | | | | |
|---|---|---|---|---|
| CN | 107848098 | A | 3/2018 | |
| DE | 102004033843 | A1 | 2/2006 | |
| DE | 102005000137 | A1 | 4/2007 | |
| DE | 102008041511 | | 3/2010 | |
| EP | 1864761 | A1 | 12/2007 | |
| EP | 2207191 | A2 | 7/2010 | |
| EP | 2746008 | A1 | 6/2014 | |
| EP | 3170624 | A1 * | 5/2017 | B23B 45/02 |
| JP | 2008119755 | A | 5/2008 | |

* cited by examiner

HAND-HELD POWER TOOL

FIELD OF THE INVENTION

The present invention relates to a chiseling hand-held power tool. The hand-held power tool has a locking switch, which allows continuous operation without the user having to keep an operating button permanently pressed.

SUMMARY OF THE INVENTION

The hand-held power tool according to the invention has an impact mechanism, an electric motor for driving the impact mechanism, and a monostable operating button, which has a stable switching position and a pressed switching position. A device controller switches off the electric motor in response to the stable switching position and activates the electric motor in response to the pressed switching position. A locking switch has a sliding direction, an actuating knob, a catch and a sliding block, wherein the actuating knob is able to be moved by the user in the sliding direction from a releasing position to a locking position. The catch is pivotable in a pivoting direction perpendicular to the switching direction between a first position and a second position. The catch is disengaged from the operating button in the first position and the catch engages in the operating button in the second position, arresting the operating button in the pressed position. The catch has, on a side facing in the pivoting direction, a slotted-guide face that is inclined with respect to the sliding direction. The sliding block bears on the slotted-guide face in the releasing position.

In the releasing position, the sliding block disengages the catch from the operating button. The switching mechanism is robust with respect to dust exposure and wear.

In one configuration, the catch has a spring, which applies a force counter to the pivoting direction to the catch. The spring acts in the same direction as the sliding block.

The catch may have a side facing counter to the pivoting direction, on which side a further slotted-guide face that is inclined with respect to the sliding direction is provided, and a finger is rigidly connected to the actuating knob, wherein the finger bears on the further slotted-guide face.

The monostable operating button may have a restoring element, which preloads the operating button counter to the switching direction.

The monostable operating button may have a switching cap, which is able to be gripped by a user and has a blocking face that interacts with the catch.

The sliding block may be disengaged from the slotted-guide face in the second position of the catch.

BRIEF DESCRIPTION OF THE DRAWINGS

The following description explains the invention with reference to exemplary embodiments and figures, in which.

DETAILED DESCRIPTION

Identical or functionally identical elements are indicated by the same reference signs in the figures, unless stated otherwise.

Figure 1:
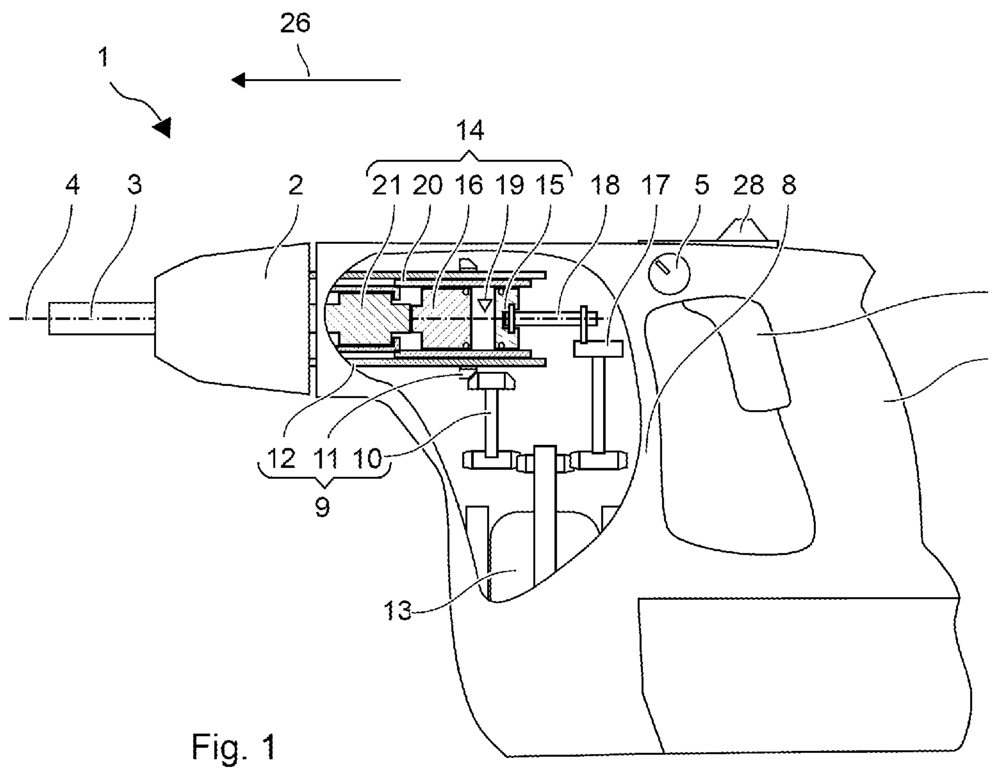
FIG. 1 shows a hammer drill

FIG. 1 schematically shows a hammer drill 1 as an example of a portable hand-held power tool. The illustrative hammer drill 1 has a tool holder 2, into which a tool 3 can be inserted and locked. The tool 3 is for example a drill bit, a chisel etc. The embodiment illustrated by way of example turns the tool holder 2 about a working axis 4 and at the same time exerts periodically impacts on the tool along the working axis 4. The hand-held power tool 1 can have a mode selector switch 5, which allows the user to selectively activate and deactivate the rotational movement and selectively activate and deactivate the percussive operation. The user can put the hand-held power tool 1 into operation by means of a monostable operating button 6.

The hand-held power tool 1 has a handle 7. The user can hold and guide the hand-held power tool 1 during operation by way of the handle 7. The operating button 6 is preferably attached to the handle 7 in such a way that the user can operate the operating button 6 using the hand holding the handle 7. The handle 7 can be decoupled from a machine housing 8 by way of damping elements.

The hand-held power tool 1 has a rotary drive 9, which is coupled to the tool holder 2. Among other things, the rotary drive 9 can have a step-down gear mechanism 10 and a slip clutch 11. An output shaft 12 of the rotary drive 9 is connected to the tool holder 2. The rotary drive 9 is coupled to an electric motor 13. The user can switch the electric motor 13 on and off by actuating the operating button 6, wherein the operating button 6 accordingly controls a power supply to the electric motor 13. In one embodiment, a rotational speed of the electric motor 13 can be set by way of the operating button 6.

The hand-held power tool 1 has a pneumatic impact mechanism 14. The pneumatic impact mechanism 14 has an exciter piston 15 and an impact piston 16. The exciter piston 15 is rigidly coupled to the electric motor 13. An eccentric wheel 17 and a connecting rod 18 convert the rotational movement of the electric motor 13 into a movement in translation on the working axis 4. The exciter piston 15 and the impact piston 16 close off a pneumatic chamber 19 between one another. In the illustrated embodiment, radial closure of the pneumatic chamber 19 is provided by a guide tube 20, which at the same time guides the exciter piston 15 and the impact piston. In other embodiments, the impact piston can be of hollow design and the exciter piston 15 is guided in the impact piston, or vice versa. The air enclosed in the pneumatic chamber 19 is compressed and decompressed by the exciter piston 15. The changes in pressure couple the impact piston to the movement of the exciter piston 15, and the pneumatic chamber 19 behaves in a similar manner to a spring, and is therefore also referred to as a pneumatic spring. The impact piston 16 can strike the tool 3 directly or strike the tool indirectly by way of an anvil 21.

Figure 2:
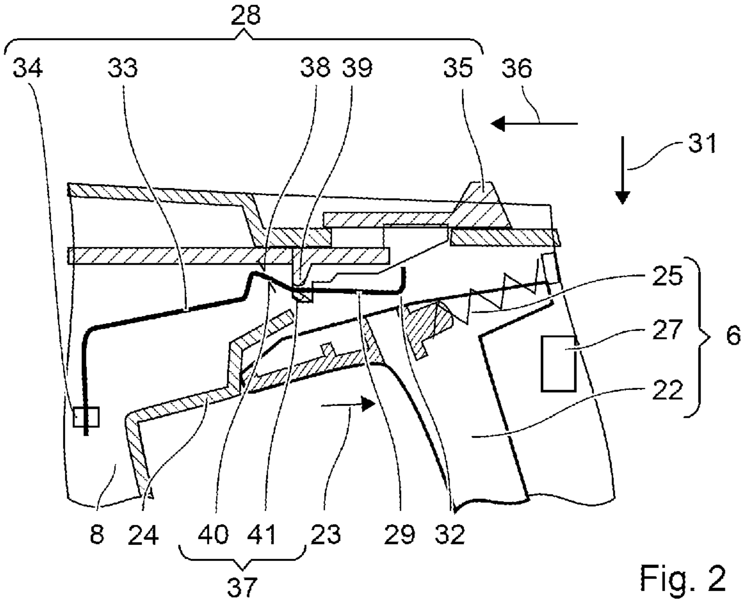
FIG. 2 shows a rest position of the operating button
Figure 3:
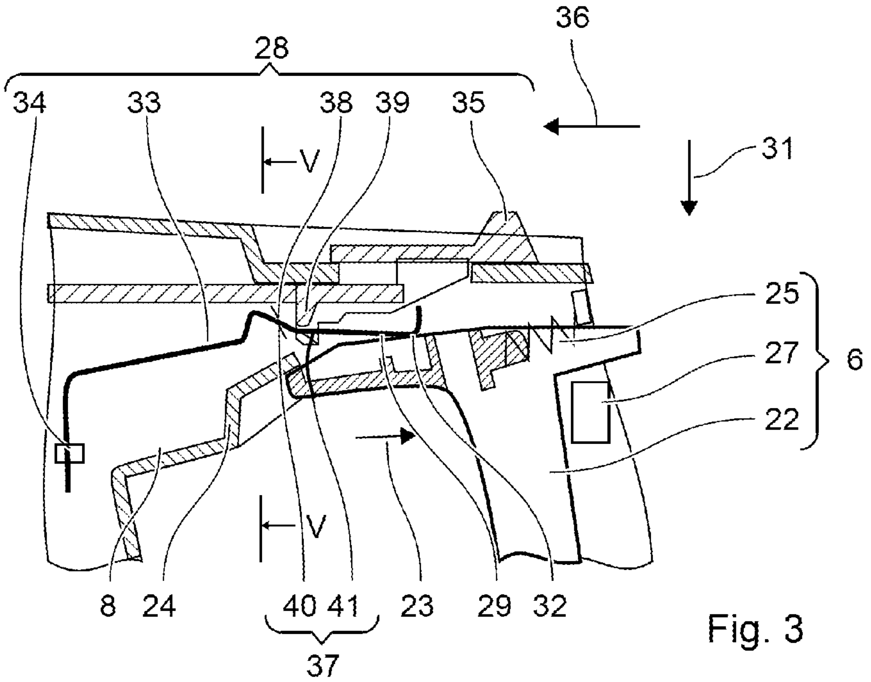
FIG. 3 shows a pressed position of the operating button

The hand-held power tool 1 is switched on and off by the operating button 6. The operating button 6 is arranged in the handle 7. The operating button 6 has a switching cap 22, which the user can grip. In a rest position of the operating button 6, the switching cap 22 protrudes from the handle 7 counter to a switching direction 23 (FIG. 2). The switching cap 22 bears preferably against a stop 24 of the machine housing 8. The user can press the switching cap 22 in the switching direction 23 into a pressed switching position (FIG. 3). In the process, the switching cap 22 can slide or pivot into the handle 7. The switching cap 22 can, as illustrated in the illustrated example, be pivotable about a bearing point or be guided in a linear manner. The switching cap 22 is at a distance from the stop 24. A restoring element

25, for example a helical spring, applies a force to the switching cap 22, said force acting counter to the switching direction 23. The restoring element 25 is tensioned to a greater extent in the pressed switching position than in the rest position, with the result that the switching cap 22 is stable only in the rest position. The switching cap 22 returns to the rest position when the user releases the switching cap 22. The switching direction 23 is preferably antiparallel to the working direction 26 in which the tool 3 is directed.

The switching cap 22 is coupled to a switching mechanism 27 of the operating button 6. The switching mechanism 27 deactivates the electric motor 13 when the switching cap 22 is in the rest position. The switching mechanism 27 activates the electric motor 13 when the switching cap 22 is in the pressed position. The switching mechanism 27 may contain an electromechanical, optical, magnetic or other sensor for determining the position of the switching cap 22. In one embodiment, the switching mechanism 27 can set a rotational speed or power consumption of the electric motor 13 depending on positions that are pressed to different extents.

Figure 4:
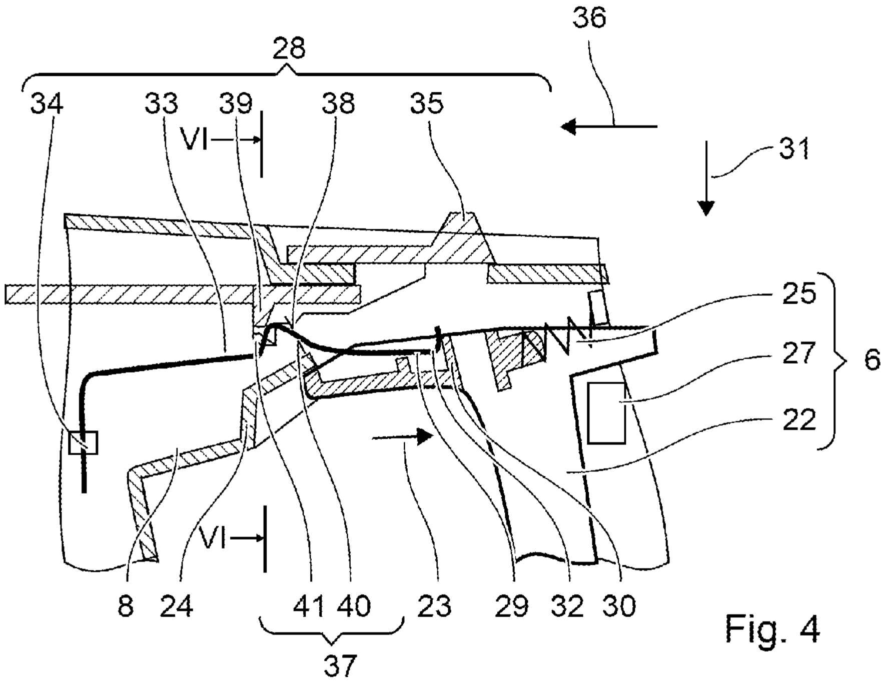
FIG. 4 shows a locked position of the operating button

The hand-held power tool 1 has a locking switch 28. The locking switch has a releasing position (FIG. 2; FIG. 3) and a locking position (FIG. 4). The locking switch 28 has a pivotable catch 29, which engages in the switching cap 22 in the locking position. The catch 29 arrests the movement of the switching cap 22 counter to the switching direction 23 and therefore prevents the switching cap 22 from returning into the rest position. The operating button 6 remains in the pressed switching position. The electric motor 13 remains activated, even if the user releases the switching cap 22.

The catch 29 interacts with the switching cap 22. The switching cap 22 has a blocking face 30, on which the catch 29 can bear in the locking position. The blocking face 30 can be realized by the outer contour of the switching cap 22 or by an externally accessible rib or the like. The blocking face 30 is preferably largely perpendicular to the switching direction 23. The blocking face 30 is directed counter to the switching direction 23 and toward the catch 29.

The catch 29 is pivotable in a pivoting direction 31 that is perpendicular to the switching direction 23. The catch 29 can be pivoted in the switching direction 23 between a first position, which is associated with the releasing position, and a second position, which is associated with the locking position. The catch 29 does not overlap the blocking face 30 in the releasing position. The overlap relates to the switching direction 23, i.e. the overlap can be determined perpendicular to the switching direction 23 in projection onto a plane. The catch 29 overlaps the blocking face 30 in the locking position. A tip 32 of the catch 29 bears on the blocking face 30 in the switching direction 23. In a similar manner to the gripping hand, the tip 32 exerts an opposing force to the restoring element, with the result that the operating button 6 remains pressed.

The position of the tip 32 along the switching direction 23 corresponds to the position of the blocking face 30 along the switching direction 23 with the operating button 6 pressed. The tip 32 can project beyond the blocking face 30 in the switching direction 23 when the operating button 6 is in the rest position. The locking switch 28 is inoperable when the hand-held power tool 1 is switched off.

The catch 29 is suspended for example on a resilient spring 33. The spring 33 can be realized for example by a leaf spring, which is connected at one end 34 to the machine housing 8. The spring 33 exerts a force acting counter to the pivoting direction 31 on the catch 29. The spring 33 can be relaxed, i.e. force-free, in the releasing position. The spring 33 is tensioned to a greater extent in the locking position than in the releasing position. The catch 29 has a tendency to move automatically from the locking position into the releasing position.

The locking switch 28 has an actuating knob 35, which is able to be gripped by the user. The user can move the actuating knob 35 in a sliding direction 36 between a first position and a second position. The first position is associated with the releasing position of the locking switch 28 and the second position is associated with the locking position of the locking switch 28. The sliding direction 36 is preferably parallel to the switching direction 23 of the operating button 6. A slotted guide 37 couples the actuating knob 35 to the catch 29.

The slotted guide 37 has a top side with an inclined slotted-guide face 38. The top side points counter to the pivoting direction 31, for example faces the actuating knob 35. The inclined slotted-guide face 38 is inclined with respect to the switching direction 23. The inclined slotted-guide face 38 is preferably inclined with respect to the switching direction 23 in the releasing position and the locking position. The inclined slotted-guide face 38 descends in the pivoting direction 31 along the switching direction 23. The actuating knob 35 is rigidly connected to a finger 39, which presses against the inclined slotted-guide face 38. The finger 39 moves the slotted guide 37 in the pivoting direction 31 when the actuating knob 35 is moved into the locking position. The catch 29 can press against the finger 39 in a manner preloaded by the spring 33, both in the releasing position and in the locking position. The catch 29 returns from the locking position into the releasing position by itself when the contact pressure exerted by the finger 39 decreases as it moves along the inclined slotted-guide face 38.

The slotted guide 37 has a bottom side with an inclined slotted-guide face 40. The bottom side points in the pivoting direction 31, for example faces away from the actuating knob 35. The inclined slotted-guide face 40 is inclined with respect to the switching direction 23. The inclined slotted-guide face 40 ascends in the pivoting direction 31 along the switching direction 23. The inclined slotted-guide face 40 is preferably inclined with respect to the switching direction 23 in the releasing position and the locking position. The actuating knob 35 is rigidly connected to a sliding block 41, which, engaging behind the slotted guide 37, can bear on the inclined slotted-guide face 40. The sliding block 41 can lift the catch 29 out of the locking position in order to support the spring 33. The catch 29, the slotted guide 37 and the spring 33 are preferably in the form of a leaf spring.

Figure 7:
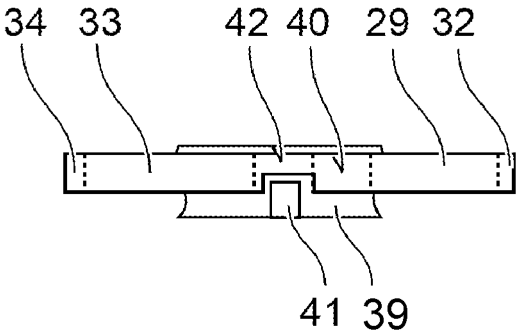
FIG. 7 shows a detail view of the catch
Figure 5:
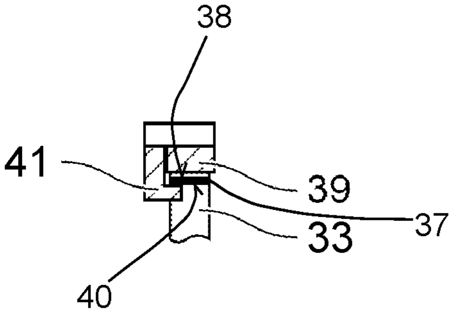
FIG. 5 shows a detail view in the section plane V-V
Figure 6:
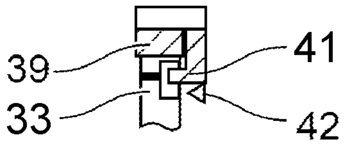
FIG. 6 shows a detail view in the section plane VI-VI

FIG. 7 shows the slotted guide 37 and the catch 29 in a view onto the bottom side. The position of the locking switch 28 corresponds to FIG. 4. In the locking position, the sliding block 41 is preferably disengaged from the slotted guide 37. The engagement of the sliding block 41 is realized for example by a narrower portion 42 of the slotted guide 37. The narrower portion 42, for example a cutout in the leaf spring, adjoins the inclined slotted-guide face 40. The slotted-guide face 40 laterally overlaps the sliding block 41. In a corresponding manner, the sliding block 41 can bear on the slotted-guide face 40 in the releasing position, as illustrated in FIG. 3 and FIG. 5. The narrower portion 42 forms an opening, and when the sliding block 41 is located therein, it is not in contact with the slotted-guide face 40. The arrangement and dimensions of the narrower portion 42 are chosen such that the sliding block 41 does not overlap the portion 42 when the locking switch 28 is in the locking position (cf. FIG. 6).

What is claimed is:

1. A hand-held power tool comprising:

an impact mechanism;

an electric motor for driving the impact mechanism;

a monostable operating button having a switching direction between a stable switching position and a pressed switching position;

a device controller switching off the electric motor in response to the stable switching position and activating the electric motor in response to the pressed switching position;

a locking switch having a sliding direction, and including an actuating knob, a catch and a sliding block, the actuating knob movable by the user in the sliding direction from a releasing position to a locking position;

the catch being pivotable in a pivoting direction perpendicular to the switching direction between a first position and a second position, the catch being disengaged from the operating button in the first position and the catch engaging in the operating button in the second position, arresting the operating button in the pressed position;

the catch including a slotted guide having a guide face and an opposing further guide face, the slotted guide being located in a slot defined by a finger rigidly connected to the actuating knob and by the sliding block, the finger bearing on the further guide face;

the sliding block being rigidly connected to the actuating knob and bearing on the guide face in the releasing position.

2. The hand-held power tool as recited in claim 1 wherein the catch has a spring applying a force counter to the pivoting direction to the catch.

3. The hand-held power tool as recited in claim 2 wherein the spring is a leaf spring.

4. The hand-held power tool as recited in claim 1 wherein the guide face faces counter to the pivoting direction.

5. The hand-held power tool as recited in claim 1 wherein the monostable operating button has a restoring element preloading the operating button counter to the switching direction.

6. The hand-held power tool as recited in claim 5 wherein the restoring element is a helical spring.

7. The hand-held power tool as recited in claim 1 wherein the monostable operating button has a switching cap grippable by a user and having a blocking face interacting with the catch.

8. The hand-held power tool as recited in claim 1 wherein the sliding block is disengaged from the guide face in the second position of the catch.

9. The hand-held power tool as recited in claim 1 further comprising a handle.

10. The hand-held power tool as recited in claim 9 further comprising a tool holder, and a rotary drive coupled to the tool holder and driven by the electric motor.

11. The hand-held power tool as recited in claim 10 wherein the monostable operating button sets a rotational speed of the electric motor.

12. The hand-held power tool as recited in claim 1 wherein the tool holder holds a tool, the tool being a drill bit or a chisel.

13. The hand-held power tool as recited in claim 1 wherein impact mechanism is a pneumatic impact mechanism.

14. A hammer drill comprising the hand-held power tool as recited in claim 1.

15. The hand-held power tool as recited in claim 1 wherein the slotted guide has a narrower portion forming an opening so that when the sliding block is located in the opening, the sliding block is not in contact with the further guide face so that he sliding block is disengaged from the slotted guide.

* * * * *